(12) United States Patent
Chang et al.

(10) Patent No.: US 11,595,084 B2
(45) Date of Patent: Feb. 28, 2023

(54) RADIO-FREQUENCY-IDENTIFICATION-BASED SMART FASTENER

(71) Applicant: Boeing company, the, Chicago, IL (US)

(72) Inventors: Chia-Ming Chang, Agoura Hills, CA (US); Hyok J. Song, Oak Park, CA (US); Adam E. Sorensen, Moorpark, CA (US); Donald W. Coffland, Seattle, WA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 17/165,666

(22) Filed: Feb. 2, 2021

(65) Prior Publication Data

US 2021/0159943 A1    May 27, 2021

Related U.S. Application Data

(63) Continuation of application No. 16/536,026, filed on Aug. 8, 2019, now Pat. No. 10,938,447.

(51) Int. Cl.
*G08B 1/08* (2006.01)
*H04B 5/00* (2006.01)
(Continued)

(52) U.S. Cl.
CPC ............. *H04B 5/0043* (2013.01); *G01B 7/24* (2013.01); *G06K 7/10366* (2013.01); *G06K 19/07777* (2013.01); *H04B 5/0062* (2013.01)

(58) Field of Classification Search
CPC ...... H04B 5/0043; H04B 5/0062; G01B 7/24; G06K 7/10366; G06K 19/07777
See application file for complete search history.

(56) References Cited

U.S. PATENT DOCUMENTS 3,695,096 A * 10/1972 Kutsay .................. G01L 1/2225
73/761
3,711,805 A * 1/1973 Heijnen .............. B26B 19/3873
336/136
(Continued)

FOREIGN PATENT DOCUMENTS

DE    102009043267 A1    4/2011
WO    WO2019140292 A1    7/2019

OTHER PUBLICATIONS

European Patent Office; Extended European Search Report for Application No. 20170004.4 dated Jan. 27, 2021.
(Continued)

*Primary Examiner* — Quang Pham
(74) *Attorney, Agent, or Firm* — Parsons Behle & Latimer (57) ABSTRACT

A system may include a fastener having a trench formed in a side of a head of the fastener. The system may further include a magneto-elastic component spanning the trench and attached to the head of the fastener on both sides of the trench. The system may also include a coil wrapped around the magneto-elastic component between both sides of the trench. The system may include a radio frequency identification (RFID) circuit, where the coil may be electrically connected to the RFID circuit resulting in a resonance response frequency that is a function of a strain level applied to the magneto-elastic component.

20 Claims, 9 Drawing Sheets

(51) Int. Cl.
*G01B 7/24* (2006.01)
*G06K 7/10* (2006.01)
*G06K 19/077* (2006.01)

(56) References Cited

U.S. PATENT DOCUMENTS

| | | | | |
|---|---|---|---|---|
| 3,800,887 A * | 4/1974 | West | | E21B 19/167 |
| | | | | 173/DIG. 3 |
| RE30,183 E * | 1/1980 | Popenoe | | G01L 5/24 |
| | | | | 336/200 |
| 4,283,941 A * | 8/1981 | Kutsay | | G01L 1/2225 |
| | | | | 73/862.635 |
| 4,295,377 A * | 10/1981 | Couchman | | G01N 29/24 |
| | | | | 73/761 |
| 4,380,763 A * | 4/1983 | Peart | | G01N 17/02 |
| | | | | 324/700 |
| 4,425,193 A * | 1/1984 | Taylor | | G01N 17/02 |
| | | | | 205/775.5 |
| 4,553,124 A * | 11/1985 | Malicki | | F16B 31/025 |
| | | | | 73/761 |
| 4,576,053 A * | 3/1986 | Hatamura | | E02F 9/26 |
| | | | | 73/862.631 |
| 4,630,490 A * | 12/1986 | Malicki | | G01L 1/22 |
| | | | | 73/761 |
| 4,846,001 A * | 7/1989 | Kibblewhite | | G01L 5/246 |
| | | | | 73/761 |
| 4,899,591 A * | 2/1990 | Kibblewhite | | B25B 23/1425 |
| | | | | 73/761 |
| 5,029,480 A * | 7/1991 | Kibblewhite | | G01L 5/246 |
| | | | | 73/761 |
| 5,131,276 A * | 7/1992 | Kibblewhite | | B06B 1/0662 |
| | | | | 73/761 |
| 5,205,176 A * | 4/1993 | Kibblewhite | | G01L 5/246 |
| | | | | 427/127 |
| 5,220,839 A * | 6/1993 | Kibblewhite | | G01L 5/246 |
| | | | | 73/761 |
| 5,222,849 A * | 6/1993 | Walton | | G01L 5/24 |
| | | | | 411/14 |
| 5,318,459 A * | 6/1994 | Shields | | H01R 13/5205 |
| | | | | 439/565 |
| 5,974,893 A * | 11/1999 | Balcarek | | G01L 9/0075 |
| | | | | 73/714 |
| 6,204,771 B1 * | 3/2001 | Ceney | | F16B 31/028 |
| | | | | 336/200 |
| 6,354,152 B1 * | 3/2002 | Herlik | | G01N 29/227 |
| | | | | 73/597 |
| 6,358,051 B2 * | 3/2002 | Lang | | A61C 8/0089 |
| | | | | 73/761 |
| 6,791,465 B2 * | 9/2004 | Blagin | | F16B 41/005 |
| | | | | 73/761 |
| 6,843,628 B1 * | 1/2005 | Hoffmeister | | G06K 19/06009 |
| | | | | 411/378 |
| 6,894,512 B2 * | 5/2005 | Girshovich | | G01N 27/121 |
| | | | | 338/35 |
| 7,180,404 B2 * | 2/2007 | Kunerth | | G01M 5/00 |
| | | | | 340/505 |
| 7,194,912 B2 * | 3/2007 | Jordan | | G01M 5/0083 |
| | | | | 374/100 |
| 7,246,980 B2 * | 7/2007 | Azzalin | | F16B 41/005 |
| | | | | 411/14 |
| 7,278,324 B2 * | 10/2007 | Smits | | G01N 27/041 |
| | | | | 73/788 |
| 7,293,466 B2 * | 11/2007 | Ohta | | F16B 31/02 |
| | | | | 73/761 |
| 7,412,898 B1 * | 8/2008 | Smith | | F16B 31/025 |
| | | | | 73/761 |
| 7,441,462 B2 * | 10/2008 | Kibblewhite | | F16B 31/02 |
| | | | | 73/761 |
| 7,958,614 B2 * | 6/2011 | Popenoe | | G01L 5/243 |
| | | | | 411/13 |
| 8,024,980 B2 * | 9/2011 | Arms | | G01L 5/1627 |
| | | | | 73/761 |
| 8,143,906 B2 * | 3/2012 | Coates | | G01K 5/48 |
| | | | | 73/152.52 |
| 8,280,210 B2 * | 10/2012 | Chowdhury | | H01Q 3/44 |
| | | | | 385/122 |
| 8,448,520 B1 * | 5/2013 | Baroudi | | G01L 5/0038 |
| | | | | 73/761 |
| 8,521,448 B1 * | 8/2013 | Ung | | F16B 1/0071 |
| | | | | 702/42 |
| 8,596,134 B2 * | 12/2013 | Mekid | | F16B 31/02 |
| | | | | 73/761 |
| 8,893,557 B2 * | 11/2014 | Mekid | | G01L 5/0038 |
| | | | | 73/761 |
| 8,963,537 B2 * | 2/2015 | Racz | | G01R 15/20 |
| | | | | 324/126 |
| 8,978,967 B2 * | 3/2015 | Gamboa | | B25B 13/00 |
| | | | | 235/375 |
| 9,329,579 B2 * | 5/2016 | Slupsky | | G01B 21/32 |
| 9,483,674 B1 * | 11/2016 | Fink | | G06K 7/10366 |
| 9,518,849 B2 * | 12/2016 | Lee | | G01N 29/223 |
| 9,645,061 B2 * | 5/2017 | Hsieh | | G01N 3/08 |
| 9,677,593 B2 * | 6/2017 | Hsieh | | F16B 31/02 |
| 9,679,235 B2 * | 6/2017 | Sugar | | G06K 19/0723 |
| 9,686,051 B2 * | 6/2017 | DiStasi | | H04L 1/1874 |
| 9,964,134 B1 * | 5/2018 | Tran | | F16B 31/025 |
| 10,450,174 B1 * | 10/2019 | Kucinic | | B66C 13/16 |
| 10,549,864 B2 * | 2/2020 | Ankney | | G06K 19/07773 |
| 10,794,783 B2 * | 10/2020 | Pagani | | G01L 1/18 |
| 11,137,013 B2 * | 10/2021 | Chu | | G01L 5/24 |
| 11,247,637 B1 * | 2/2022 | Angelillo | | B60R 25/40 |
| 2003/0000314 A1 * | 1/2003 | Smith | | G01L 1/2225 |
| | | | | 73/849 |
| 2003/0037591 A1 * | 2/2003 | Ashton | | A61B 5/0031 |
| | | | | 623/1.1 |
| 2004/0003683 A1 * | 1/2004 | Rudduck | | B25B 23/1425 |
| | | | | 81/52 |
| 2004/0065154 A1 * | 4/2004 | Kibblewhite | | F16B 31/02 |
| | | | | 73/761 |
| 2005/0063125 A1 * | 3/2005 | Kato | | F16L 37/144 |
| | | | | 361/113 |
| 2005/0134254 A1 * | 6/2005 | Roden | | G01R 1/203 |
| | | | | 324/126 |
| 2006/0022056 A1 * | 2/2006 | Sakama | | G06K 19/07771 |
| | | | | 235/492 |
| 2006/0043198 A1 * | 3/2006 | Forster | | H01Q 5/40 |
| | | | | 235/492 |
| 2006/0082356 A1 * | 4/2006 | Zhang | | G01R 15/181 |
| | | | | 324/117 R |
| 2006/0130590 A1 * | 6/2006 | Kibblewhite | | F16B 25/10 |
| | | | | 73/761 |
| 2006/0180650 A1 * | 8/2006 | Claessens | | G06K 19/07749 |
| | | | | 235/383 |
| 2007/0018837 A1 * | 1/2007 | Mizutani | | G08C 17/00 |
| | | | | 340/635 |
| 2008/0061145 A1 * | 3/2008 | McGushion | | G06Q 10/08 |
| | | | | 29/407.04 |
| 2008/0115589 A1 * | 5/2008 | DeRose | | F16B 31/02 |
| | | | | 73/761 |
| 2008/0115636 A1 * | 5/2008 | DeRose | | B25B 23/1425 |
| | | | | 81/479 |
| 2008/0122704 A1 * | 5/2008 | King | | H01Q 1/52 |
| | | | | 343/702 |
| 2008/0178713 A1 * | 7/2008 | Long | | B25B 23/14 |
| | | | | 73/862.21 |
| 2009/0071078 A1 * | 3/2009 | Rakow | | F16B 33/06 |
| | | | | 52/698 |
| 2009/0112925 A1 * | 4/2009 | Amirehteshami | | F16B 1/0071 |
| 2010/0050778 A1 * | 3/2010 | Herley | | F16B 31/02 |
| | | | | 73/761 |
| 2010/0054891 A1 * | 3/2010 | Nishida | | B25B 23/14 |
| | | | | 73/761 |
| 2010/0116101 A1 * | 5/2010 | Dral | | B25B 23/14 |
| | | | | 411/533 |
| 2011/0181393 A1 * | 7/2011 | Tillotson | | F16B 31/02 |
| | | | | 73/761 |
| 2013/0068031 A1 * | 3/2013 | Mekid | | F16B 31/02 |
| | | | | 73/761 |

(56) References Cited

U.S. PATENT DOCUMENTS

| | | | |
|---|---|---|---|
| 2013/0186951 A1* | 7/2013 | Zhu | F16B 31/02 |
| | | | 235/375 |
| 2013/0189134 A1* | 7/2013 | Irie | F04D 29/588 |
| | | | 417/423.7 |
| 2013/0199026 A1* | 8/2013 | Mazoki | G06K 19/07758 |
| | | | 29/601 |
| 2013/0328693 A1* | 12/2013 | Mohamadi | E21B 43/267 |
| | | | 340/854.6 |
| 2014/0129158 A1* | 5/2014 | Shea | G01L 1/142 |
| | | | 702/57 |
| 2014/0165796 A1* | 6/2014 | Gauthier | B25H 3/006 |
| | | | 81/479 |
| 2014/0224886 A1* | 8/2014 | Nihei | G06K 19/07794 |
| | | | 235/492 |
| 2014/0288669 A1* | 9/2014 | Sanders | A61F 2/7812 |
| | | | 623/36 |
| 2014/0298916 A1* | 10/2014 | Duan | G01L 1/12 |
| | | | 73/779 |
| 2015/0041162 A1* | 2/2015 | Chu | B25B 23/147 |
| | | | 173/1 |
| 2015/0063941 A1* | 3/2015 | Hsieh | F16B 31/025 |
| | | | 411/14 |
| 2016/0180664 A1* | 6/2016 | Carrender | G06K 19/07794 |
| | | | 340/539.1 |
| 2017/0016469 A1* | 1/2017 | Zhu | G06K 19/0775 |
| 2018/0000556 A1* | 1/2018 | Blair | A61F 13/44 |
| 2018/0028275 A1* | 2/2018 | Bradley | G06K 7/10009 |
| 2018/0118158 A1* | 5/2018 | Davis | B60Q 9/00 |
| 2019/0145462 A1* | 5/2019 | Jansa | G01M 13/04 |
| | | | 384/416 |
| 2019/0244071 A1* | 8/2019 | Grove | G06K 19/07771 |
| 2020/0376633 A1* | 12/2020 | Ryota | B23P 19/107 |

OTHER PUBLICATIONS

U.S. Patent and Trademark Office; Office Action for U.S. Appl. No. 16/536,026 dated Mar. 3, 2020.

U.S. Patent and Trademark Office; Final Office Action for U.S. Appl. No. 16/536,026 dated Jul. 2, 2020.

U.S. Patent and Trademark Office; Notice of Allowance and Fees Due for U.S. Appl. No. 16/536,026 dated Oct. 27, 2020.

\* cited by examiner

RADIO-FREQUENCY-IDENTIFICATION-BASED SMART FASTENER

CROSS-REFERENCE TO RELATED APPLICATIONS

This application is a continuation of, and claims the benefit of, U.S. patent application Ser. No. 16/536,026, filed on Aug. 8, 2019, and entitled "Radio-Frequency-Identification-Based Smart Fastener," the contents of which are incorporated by reference herein in their entirety.

FIELD OF THE DISCLOSURE

This disclosure is generally related to the field of fasteners and, in particular, to radio-frequency-identification-based smart fasteners.

BACKGROUND

Radio frequency identification (RFID) systems have become ubiquitous for tracking and identifying assets of interest. RFID tags can be classified as passive or active based on a power source of the tag. The most common form of RFID systems uses passive tags in which an RFID chip is powered by an impinging field radiated from a reader. A typical ultra-high frequency (UHF)-band RFID tag may include a dipole type of antenna and an RFID integrated circuit (IC) chip. RFID chips may be available off-the-shelf from numerous manufacturers. Most RFID chips in the LF, HF, and UHF bands exhibit some capacitive reactance along with some resistance. The complex impedance of the RFID chip may be conjugate matched to that of the antenna for a maximum power transfer by adding an inductive loop as part of the antenna. The inductive loop in typical applications exhibits a fixed inductance in order to ensure the RFID tag may communicate with a reader at a specific predetermined RFID frequency.

RFID systems may also be integrated with sensors to enable wireless sensor systems. For example, an RFID sensor system may include a strain sensor and a microprocessor to process data measured by the strain sensor for communication via the RFID tag to a reader. A typical sensor-integrated RFID tag may include a sensor, a microprocessor, an RFID circuit, an antenna, and a dedicated power source. However, the combination of all these systems makes size, weight, and power (SWAP) requirements of typical RFID systems undesirable for many deployment scenarios. Additional disadvantages may exist.

SUMMARY

Disclosed herein is a smart-fastener (e.g., a sensor) system that overcomes at least one of the shortcomings of typical RFID sensing systems. The sensor system may be used for various applications, including determining whether a fastener (e.g., a bolt) is loose or tight. In an embodiment, the system includes a magneto-elastic material-based strain sensor attached to a fastener. The magneto-elastic material is part of a variable inductor having an inductance that changes as a function of the strain developed on a fastener. The variable inductor is designed to conjugate match an antenna to an RFID circuit for a designed "normal" strain condition such that the RFID circuit resonates within a designated RFID operating band. In some embodiments, the normal strain condition may be associated with the fastener being tightened. In some embodiments, the normal strain condition may be associated with the fastener being loose.

In some embodiments of a system in accordance with aspects of this disclosure, a system includes a fastener and a magneto-elastic component connected to the fastener, where a strain level applied to the magneto-elastic component is a function of a tightness level within a range of tightness levels of the fastener. The system further includes an RFID circuit, and an antenna electrically connected to the RFID circuit. The system includes a variable inductor circuit electrically connected to the RFID circuit and to the antenna, where an inductance exhibited by the variable inductor circuit is a function of the strain level applied to the magneto-elastic component, where a resonance response frequency of the RFID circuit is a function of the inductance exhibited by the variable inductor circuit, and where a change in the strain level results in a shift in the resonance response frequency.

In some of such embodiments, the range of tightness levels of the fastener comprises first and second non-overlapping sub-ranges of tightness levels that correspond, respectively, to a tightened state of the fastener and an untightened state of the fastener, where the tightened state of the fastener and the untightened state of the fastener correspond, respectively, to first and second non-overlapping resonance response frequency bands. In some of such embodiments, the first non-overlapping resonance response frequency band corresponds to a designated RFID band or the second non-overlapping resonance response frequency band corresponds to the designated RFID band.

In some of such embodiments, the system also includes an RFID reader configured to transmit an excitation signal at a predetermined frequency that enables resonance of the RFID circuit and activates the RFID circuit in response to a first range of strain levels applied to the magneto-elastic component, and does not enable resonance and does not activate the RFID circuit in response to a second range of strain levels applied to the magneto-elastic component. In some embodiments, the first range of strain levels is associated with the fastener being in a tightened state and the second range of strain levels is associated with the fastener being in an untightened state, or the first range of strain levels is associated with the fastener being in an untightened stated and the second range of strain levels is associated with the fastener being in a tightened state.

In some embodiments that include an RFID reader, the RFID reader is configured to transmit an excitation signal over a range of frequencies, to determine the resonance response frequency of the RFID circuit, and to map the resonance response frequency of the RFID circuit to the strain level applied to the magneto-elastic component.

In some embodiments, the system also includes additional fasteners associated with additional RFID circuits and with additional variable inductor circuits, and an RFID reader configured to transmit an excitation signal having a predetermined frequency that matches the resonance response frequency of the RFID circuit in response to the strain level applied to the magneto-elastic component corresponding to the fastener being in an untightened state, thereby enabling the fastener to be located among the additional fasteners in response to the additional fasteners being in a tightened state. In some embodiments, the RFID circuit is configured to transmit an identifier to locate the fastener in response to the predetermined frequency matching the resonance response frequency of the RFID circuit.

In some embodiments, the system also includes a second magneto-elastic component connected to the fastener, a second RFID circuit, a second antenna electrically connected to the RFID circuit, and a second variable inductor circuit electrically coupled to the second RFID circuit and to the second antenna, where a second inductance level exhibited by the second variable inductor circuit is a function of a second strain level applied to the second magneto-elastic component, where a second resonance response frequency of the second RFID circuit is a function of the second inductance exhibited by the second variable inductor circuit, and where a change in the second strain level results in a shift in the second resonance response frequency. In some embodiments, the resonance response frequency of the RFID circuit is within a designated RFID band in response to the strain level applied to the magneto-elastic component corresponding to the fastener being in a tightened state, and the second resonance response frequency of the second RFID circuit is within the designated RFID band in response to the second strain level applied to the second magneto-elastic component corresponding to the fastener being in an untightened state.

In some embodiments of an apparatus in accordance with aspects of this disclosure, an apparatus includes an RFID circuit and an antenna electrically connected to the RFID circuit. The apparatus also includes a variable inductor circuit electrically coupled to the RFID circuit and to the antenna, the variable inductor circuit having a magneto-elastic component, where an inductance exhibited by the variable inductor circuit is a function of a strain level applied to the magneto-elastic component, wherein a resonance response frequency of the RFID circuit is a function of the inductance exhibited by the variable inductor circuit, where a change in the strain level results in a shift in the resonance response frequency, and where a predetermined strain level range results in a predetermined resonance response frequency band.

In some of such embodiments, the antenna is a dipole type of antenna, and the predetermined resonance response frequency band is a UHF band. In some embodiments, the antenna is a loop type of antenna, and the predetermined resonance response frequency band is a high-frequency (HF) band or a low-frequency (LF) band. In some embodiments, the variable inductor circuit is incorporated into a loop of the loop type of antenna. In some embodiments, the variable inductor circuit includes an inductor coil surrounding the magneto-elastic component. In some embodiments, the magneto-elastic component includes a multiferroic material core.

In some embodiments of a method in accordance with aspects of this disclosure, a method includes providing an RFID circuit. The method further includes electrically connecting an antenna to the RFID circuit. The method also includes electrically connecting a variable inductor circuit having a magneto-elastic component to the RFID circuit and to the variable inductor circuit, where an inductance exhibited by the variable inductor circuit is a function of a strain level applied to the magneto-elastic component, where a resonance response frequency of the RFID circuit is a function of the inductance exhibited by the variable inductor circuit, and where a change in the strain level results in a shift in the resonance response frequency.

In some embodiments, the method includes connecting the magneto-elastic component to a fastener, where the resonance response frequency is within a designated RFID band in response to the strain level applied to the magneto-elastic component corresponding to the fastener being in a tightened state. In some embodiments, the method includes connecting the magneto-elastic component to a fastener, where the resonance response frequency is within a designated RFID band in response to the strain level applied to the magneto-elastic component corresponding to the fastener being in an untightened state. In some embodiments, the method includes changing the strain level applied to the magneto-elastic component and thereby shifting the resonance response frequency of the RFID circuit.

While the disclosure is susceptible to various modifications and alternative forms, specific, illustrative example embodiments are shown by way of example in the drawings and are described in detail herein. However, the disclosure is not limited to the particular forms disclosed, but covers all modifications, equivalents and alternatives falling within the scope of the disclosure.

DETAILED DESCRIPTION

Referring to FIGS. 1-4, several illustrative embodiments of an RFID-based smart fastener system are schematically depicted. The configurations differ somewhat, as explained in detail herein. In the different configurations, the same reference numerals are used to refer to the same parts, components, and/or concepts, and variations thereof among the different configurations are represented by different reference numerals.

Figure 1:
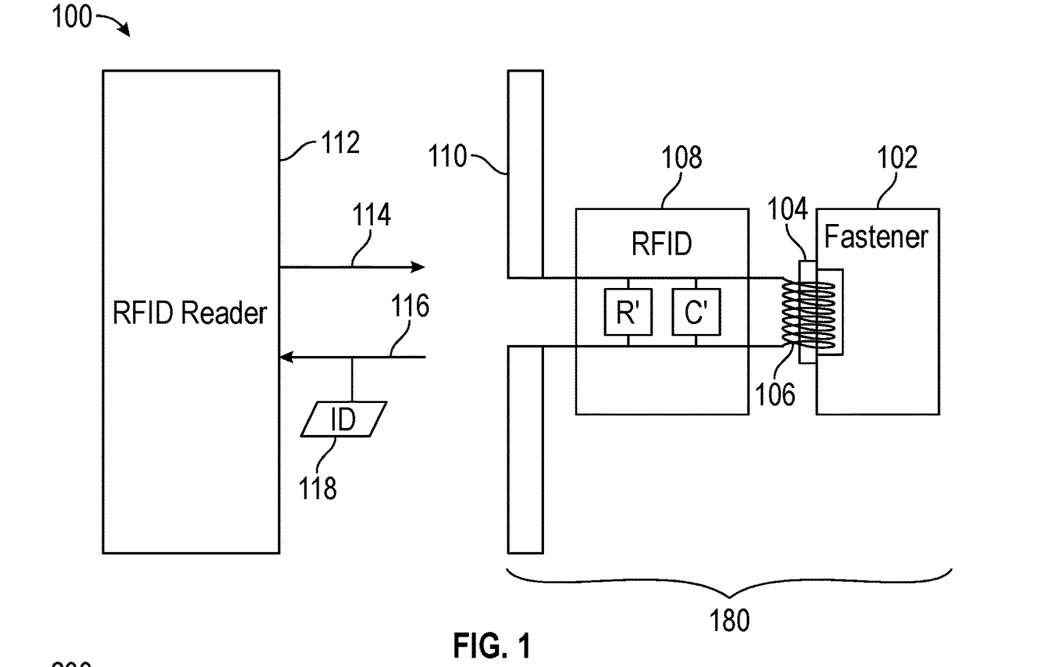
FIG. 1 depicts an illustrative embodiment of an RFID-based smart fastener system that incorporates a dipole antenna, in accordance with aspects of this disclosure.

Referring to FIG. 1, an illustrative embodiment of an RFID-based smart fastener system 100 is depicted. The system 100 includes an RFID circuit 108, an antenna 110, and a variable inductor circuit 106. The antenna 110 is shown as a dipole antenna. The RFID circuit 108 includes a passive RFID circuit that exhibits a capacitive reactance and a resistance over the UHF band. A resonance response frequency of the RFID circuit 108 is dependent on an inductance of the variable inductor circuit 106. When the complex impedance of the RFID circuit 108 is conjugate matched to that of the antenna 110, using the variable inductor circuit 106, significant power transfer may be achieved. By modifying the inductance of the variable inductor circuit 106, the resonance response frequency of the RFID circuit 108 may be altered.

The system 100 includes a magneto-elastic component 104 attached to a fastener 102. The magneto-elastic component 104 may form part of the variable inductor circuit 106. For example, in some embodiments, the variable inductor circuit 106 is a coil wrapped around the magneto-elastic component 104 as depicted in FIG. 1. However, other configurations are possible.

Strain applied to the magneto-elastic component 104, e.g., through tightening the fastener 102, causes a change in the magnetic permeability of the magneto-elastic component 104, which further results in a change in the inductance exhibited by the variable inductor circuit 106. The change in inductance changes the resonance response frequency of the RFID circuit 108. In this way, the resonance response frequency of the RFID circuit 108 is ultimately dependent on the tightness of the fastener 102. These relationships are described further herein.

The RFID circuit 108, the antenna 110, the variable inductor circuit 106, and the magneto-elastic component 104 may be packaged together as an apparatus 180. The system 100 may further include additional components to the apparatus 180.

The system 100 further includes an RFID reader 112. The RFID reader 112 may operate in a LF mode, a HF mode, an UHF mode, or any combination thereof. As used herein, LF means a predetermined frequency band within the hundred kilohertz range and allocated for RFID use by a standards organization. For example, LF may be between 120 kHz and 150 kHz. HF means a predetermined frequency band within the ten-megahertz range and allocated for RFID use. For example, HF may be around 13.56 MHz. UHF means a predetermined frequency band within the hundred-megahertz range and allocated for RFID use. For example, UHF may between 865-868 MHz in Europe and between 902-928 MHz in North America. In some embodiments, the RFID reader 112 may be capable of performing frequency sweeps to determine a resonance response frequency of the RFID circuit 108.

During operation, the RFID reader 112 transmits an excitation signal 114 to the RFID circuit 108. When a resonance response frequency of the RFID circuit 108 corresponds to a frequency of the excitation signal 114, the RFID circuit 108 is activated. When activated, the RFID circuit 108 transmits a response signal 116 to the RFID reader 112. The response signal 116 includes an identifier 118 that uniquely identifies the RFID circuit 108. Because the resonance response frequency of the RFID circuit 108 is ultimately dependent on the tightness of the fastener 102, the RFID reader 112 may be used to determine whether the fastener 102 is tight or loose. In some cases, the RFID circuit 108 may be configured to activate when the fastener 102 is tight. In those cases, the RFID reader 112 may determine that the fastener 102 is loose when no response signal 116 is received. In some cases, the RFID circuit 108 may be configured to activate when the fastener 102 is loose. In those cases, the RFID reader 112 may determine that the fastener 102 is tight when no response signal 116 is received. In some cases, the RFID reader 112 may be configured to perform a sweep to determine the resonance response frequency of the RFID circuit 108, which may then be correlated to a tightness level of the fastener 102. These configurations are described further herein.

Figure 2:
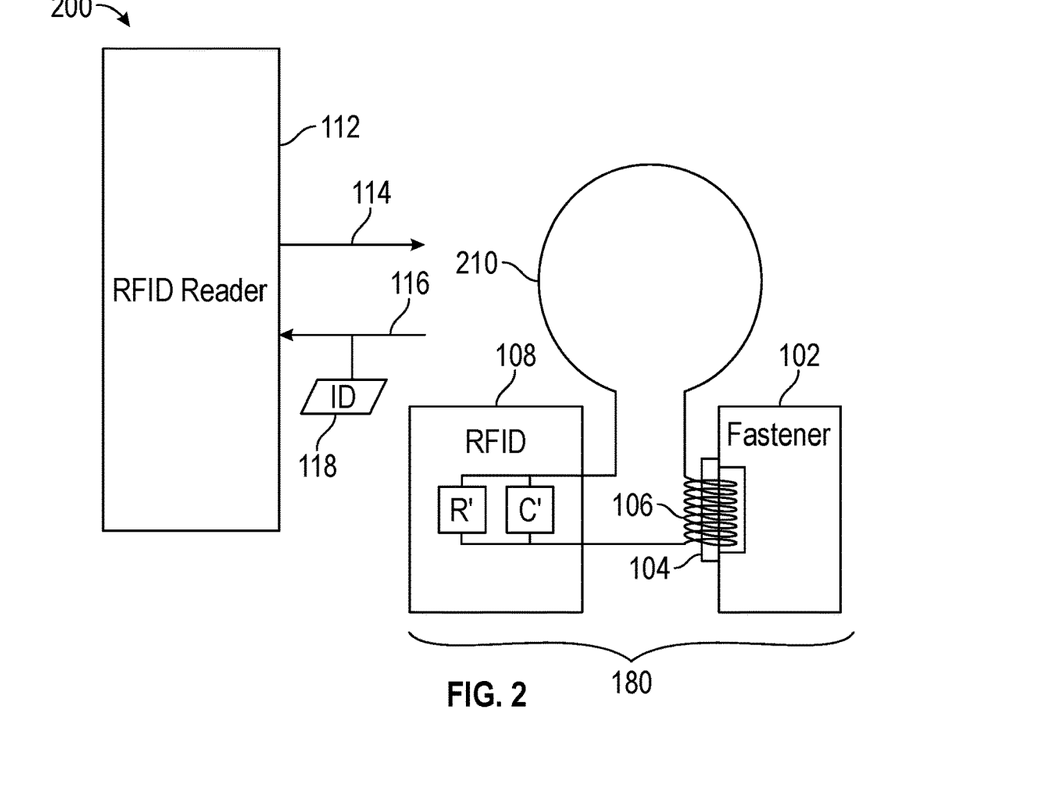
FIG. 2 depicts an illustrative embodiment of an RFID-based smart fastener system that incorporates a loop antenna, in accordance with aspects of this disclosure.

Referring to FIG. 2, another illustrative embodiment of an RFID-based smart fastener system 200 is depicted. Instead of a dipole antenna, such as antenna 110 of system 100, system 200 includes a loop antenna 210. The variable inductor circuit 106 forms part of the loop of the loop antenna 210 as shown in FIG. 2. For example, the variable inductor circuit 106 may be a coil wrapped around the magneto-elastic component 104 and electrically coupled in series with the loop antenna 210. Other configurations are possible. Further, although FIGS. 1 and 2 depict a dipole and loop antenna, respectively, other types of antennas may be used with the systems 100, 200. Dipole antennas may be more effective in an ultra-high-frequency (UHF) band, while loop antennas may be more effective in a high-frequency (HF) band or a low-frequency (LF) band.

A benefit of the systems 100, 200 is that a strain sensor attached to the fastener 102 may be implemented in a form factor similar to typical passive RFID circuit configurations. However, by using the variable inductor circuit 106 for impedance matching, instead of a fixed inductor, a resonance response frequency of the RFID circuit 108 may be correlated to a strain at the fastener 102. Further, the systems 100, 200 may have a beneficial size, weight, and power compared to typical fastener strain sensors which may additionally rely on microprocessors and dedicated power sources.

Figure 3:
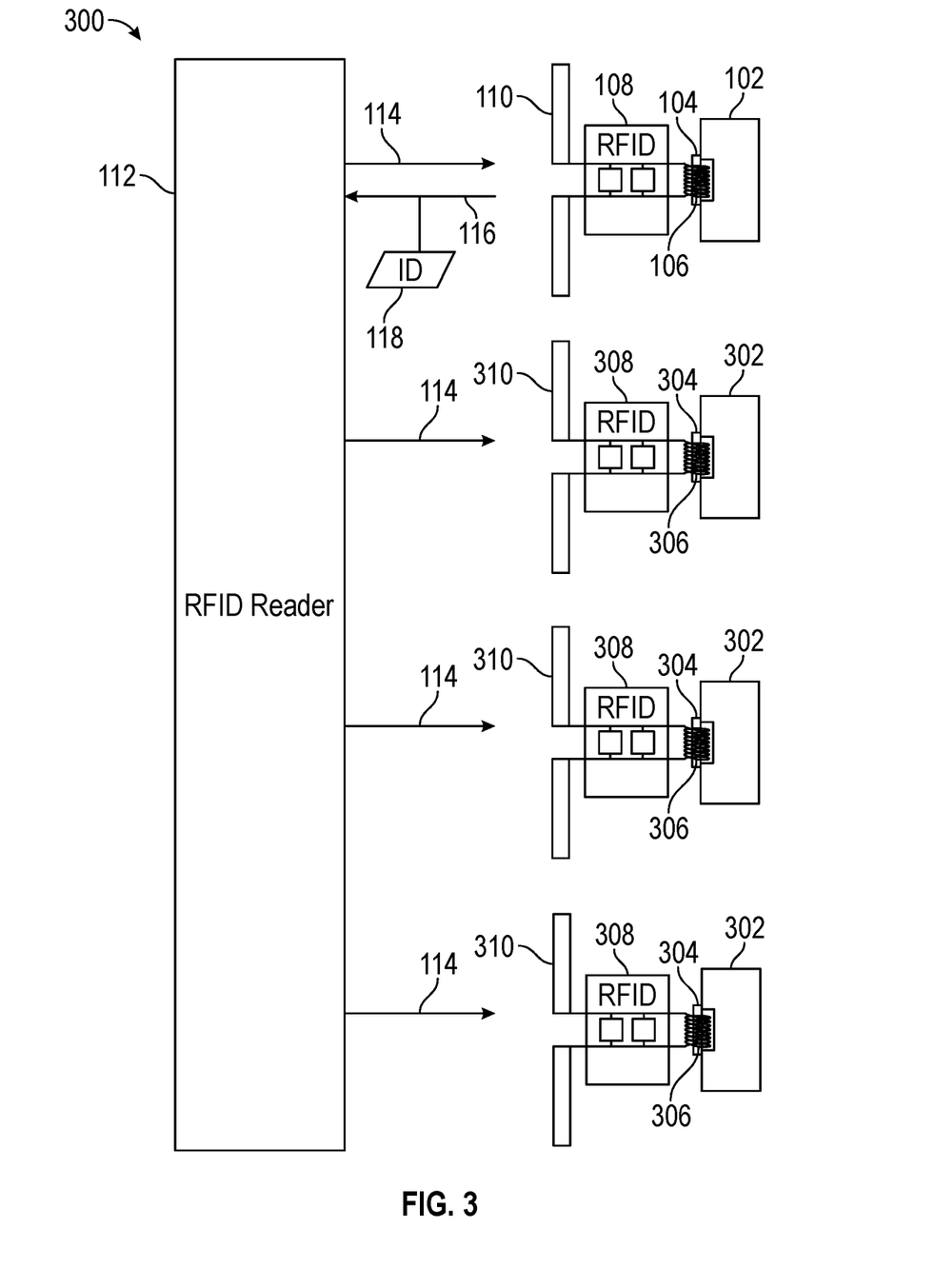
FIG. 3 depicts an illustrative embodiment of an RFID-based smart fastener system having multiple fasteners, in accordance with aspects of this disclosure.

The concepts discussed above with reference to systems 100 and 200 as depicted in FIGS. 1 and 2 may be employed in a system that includes multiple fasteners, for example to enable one or more loose fasteners to be located among tightened fasteners. Referring to FIG. 3, another illustrative embodiment of an RFID-based smart fastener system 300 is depicted. The system 300 includes additional fasteners 302, and additional magneto-elastic components 304 fixed to the respective additional fasteners 302, such that a tightness of the additional fasteners 302 affects the magnetic permeability of the additional magneto-elastic components 304. Additional variable inductor circuits 306 are positioned in proximity to the additional magneto-elastic components 304 such that a strain level applied to the additional magneto-elastic components 304 affects an inductance of the additional variable inductor circuits 306. Additional RFID circuits 308 and antennas 310 are also respectively associated with each of the additional fasteners 302.

During operation of system 300, the variable inductor circuit 106 and each of the additional variable inductor circuits 306 may be impedance matched with the RFID circuit 108 and the additional RFID circuits 308 such that their respective resonance response frequencies correspond to the excitation signal 114 emitted from the RFID reader 112 when the fastener 102 and the additional fasteners 302 are in an untightened state. In the case where, for example, the fastener 102 is in an untightened (i.e., loose or loosened) state and each of the additional fasteners 302 are in a tightened state, then the additional RFID circuits 308 may refrain from activating in response to the excitation signal 114. The RFID circuit 108, however, may activate and send a response signal 116 to the RFID reader 112. In that way, the RFID reader 112 may be able to locate the fastener 102 (e.g., a loosened fastener) among the additional fasteners 302 (e.g., tightened fasteners). In some cases, the RFID reader 112 may be swept across the fastener 102 and the additional fasteners 302 in order to find which, if any, is loosened. In some embodiments, the RFID circuit 108, when loosened, may transmit an identifier 118 that can usable to locate the fastener 102.

In one example use of a system such as the system 300, a technician may be able to determine that a group of fasteners are tightened, or locate one or more loosened fasteners among tightened fasteners, quickly and efficiently, without physically testing each fastener. Other benefits may exist.

Figure 4:
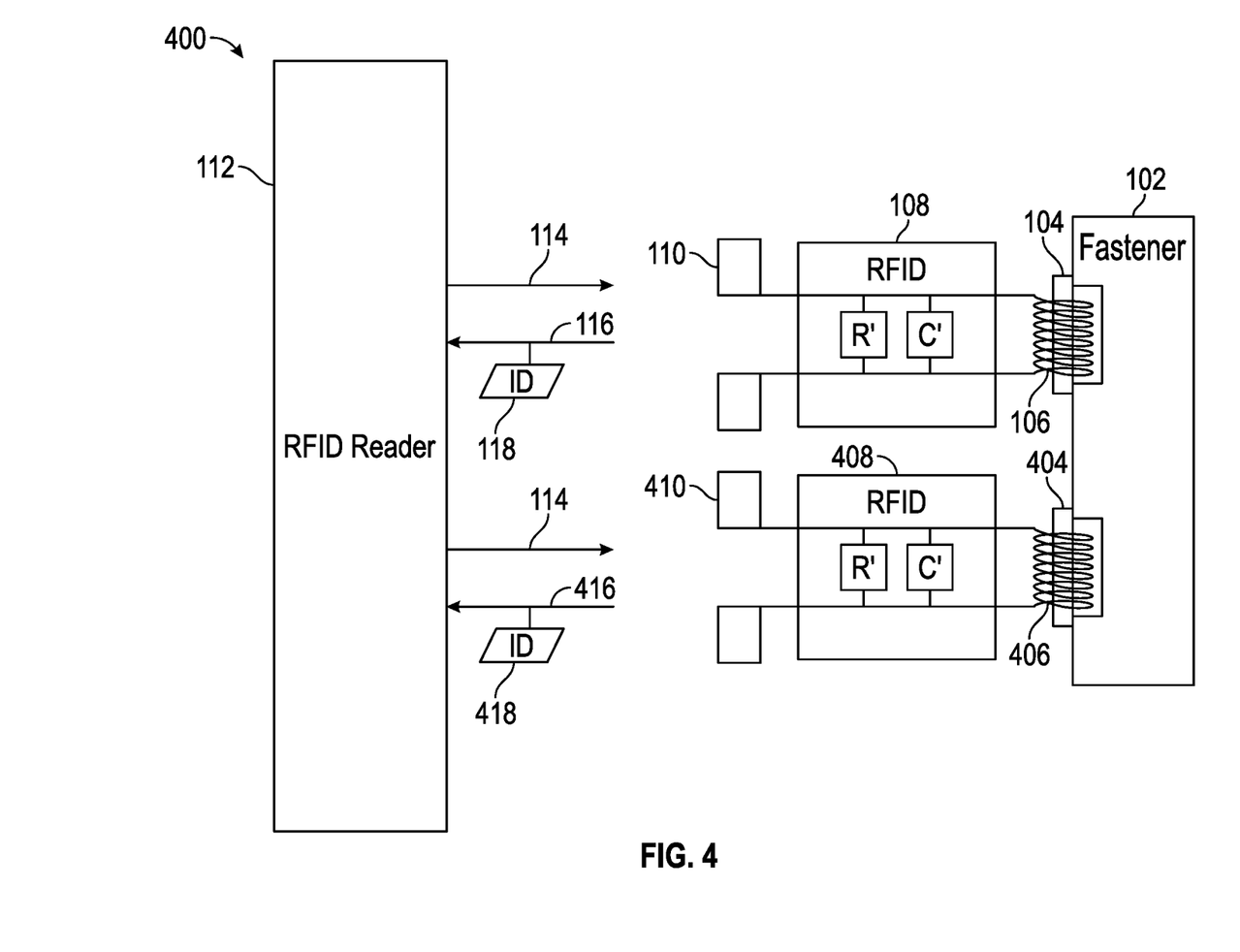
FIG. 4 depicts an illustrative embodiment of an RFID-based smart fastener system having multiple RFID circuits on a fastener, in accordance with aspects of this disclosure.

Referring to FIG. 4, another illustrative embodiment of an RFID-based smart fastener system 400 is depicted. The system 400 includes a second magneto-elastic component 404 attached to the fastener 102, a second variable inductor circuit 406, a second RFID circuit 408, and a second antenna 410. The system 400 enables receiving the response signal 116 and the identifier 118 when the fastener 102 is in a first state (e.g., loosened) or receiving a second response signal 416 and a second identifier 418 when the fastener 102 is in a second state (e.g., tightened).

For example, the variable inductor circuit 106 may be impedance matched with the RFID circuit 108 such that a resonance response frequency of the RFID circuit 108 corresponds to a predetermined frequency of the excitation signal 114 when the fastener 102 is loosened. The second variable inductor circuit 406 may be impedance matched with the second RFID circuit 408 such that a resonance response frequency of the second RFID circuit 408 corresponds to the predetermined frequency of the excitation signal 114 when the fastener 102 is tightened. Thus, when the fastener 102 is loosened, the response signal 116 may be received including the identifier 118, indicating to the RFID reader 112 that the fastener 102 is loose. When the fastener 102 is tight, a second response signal 416 may be received including the second identifier 418, indicating to the RFID reader 112 that the fastener 102 is tight.

In one example use of a system such as the system 400, a signal can be received whether the fastener 102 is tight or loose, which may allow a technician to discern whether a potential reader malfunction has occurred. Other benefits may exist.

Figure 9:
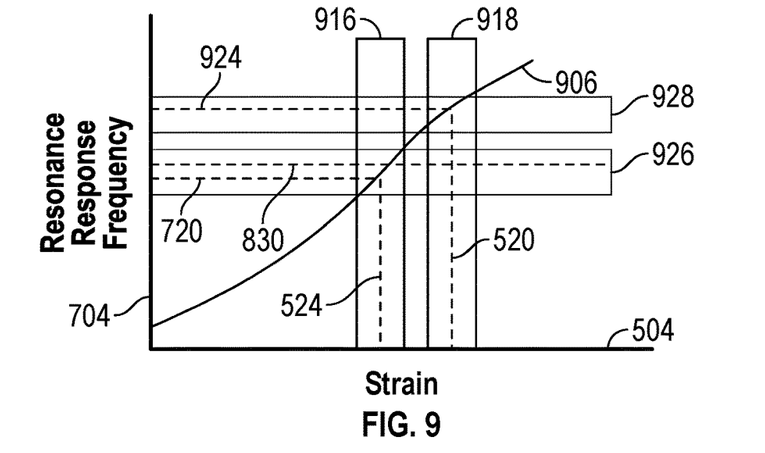
FIG. 9 depicts a graph showing resonance response frequencies of an RFID circuit as a function of strain applied to a magneto-elastic component.
Figure 10:
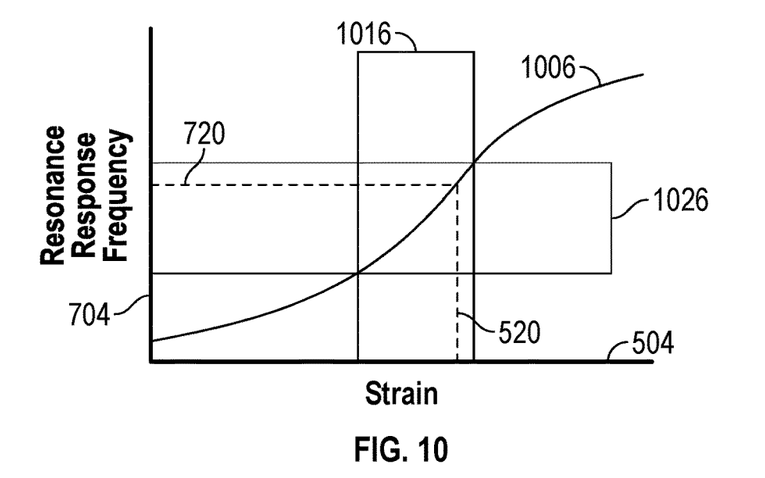
FIG. 10 depicts a graph showing resonance response frequencies of an RFID circuit as a function of strain applied to a magneto-elastic component.
Figure 11:
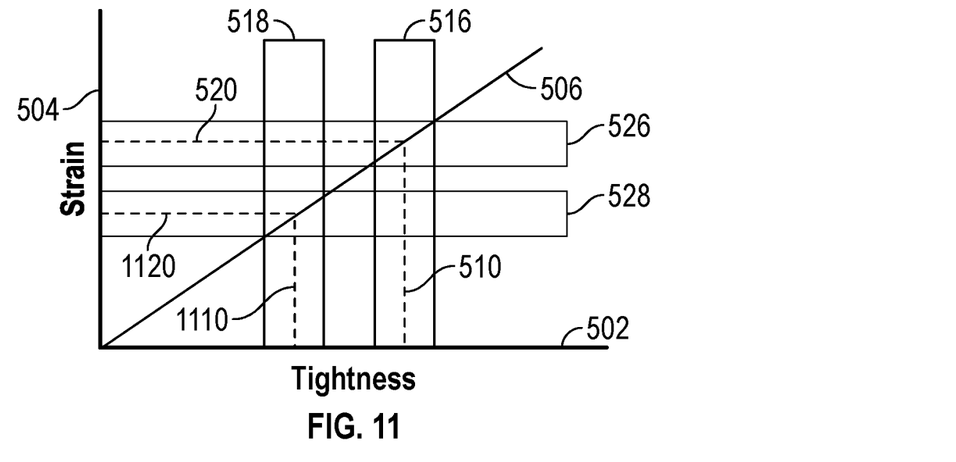
FIG. 11 depicts a graph showing strain at magneto-elastic components as a function of a range of tightness levels of a fastener.
Figure 12:
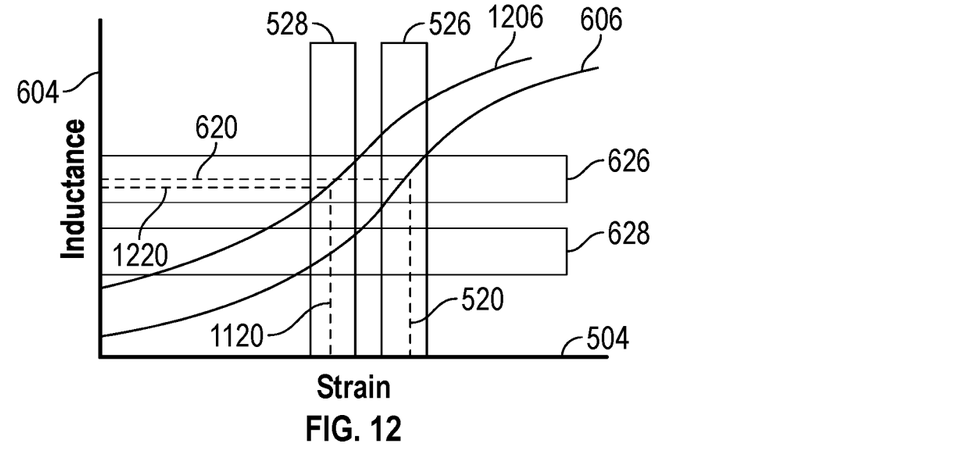
FIG. 12 depicts a graph showing inductance of variable inductor circuits as a function of strain at magneto-elastic components.
Figure 13:
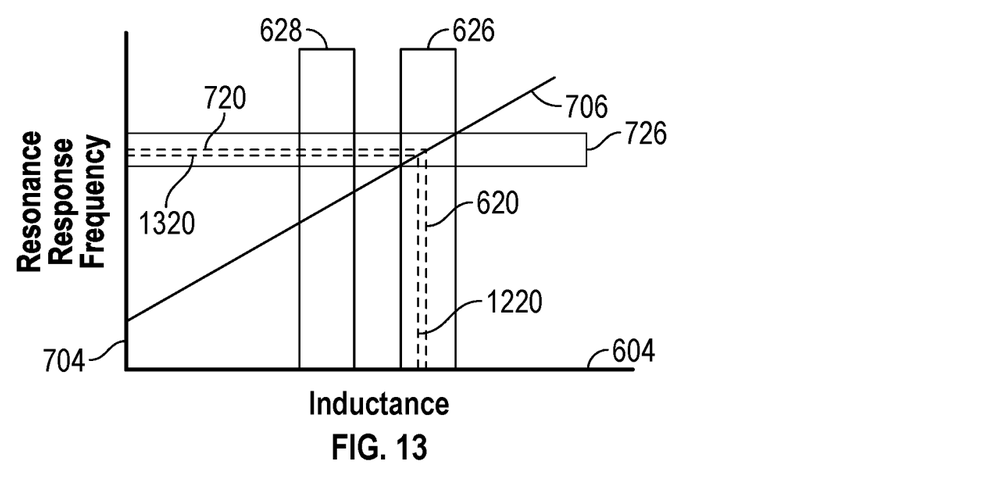
FIG. 13 depicts a graph showing resonance response frequencies of RFID circuits as a function of inductance at the variable inductor circuits.

FIGS. 5-13 illustrate, in the form of a series of graphs, different possible functional relationships between a tightness level of fasters, strain placed on magneto-elastic components attached to the fasteners, inductance exhibited by variable inductor circuits that may be coupled to, or include, the magneto-elastic components, and resonance response frequencies of RFID circuits electrically connected to the variable inductor circuits. FIGS. 5-10 correspond to the configuration depicted in FIGS. 1 and 2. FIGS. 11-13 correspond to the configuration depicted in FIG. 4.

Figures 5, 6:
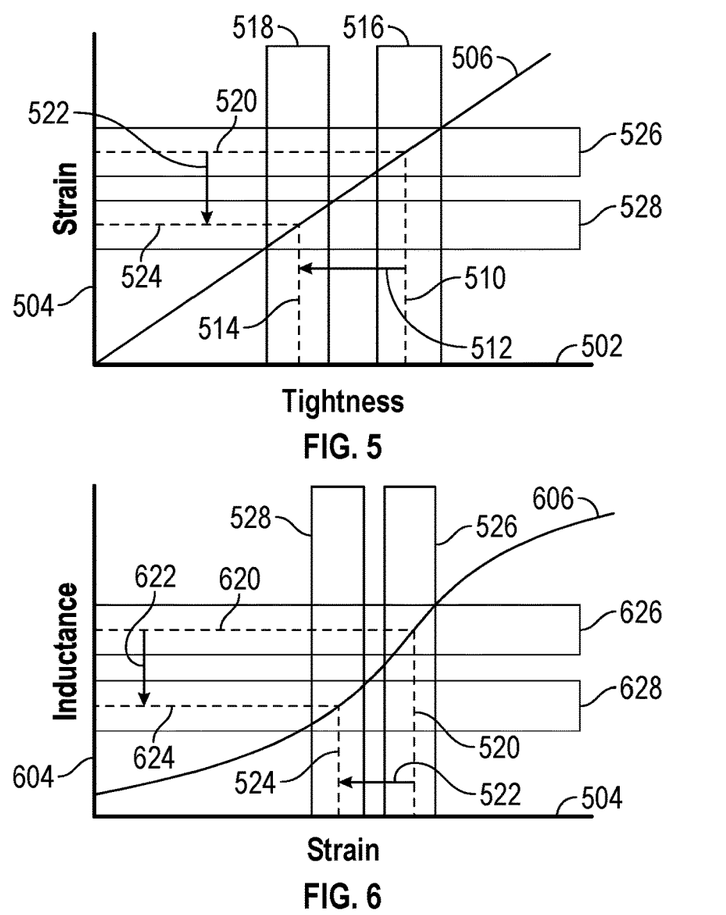
FIG. 5 depicts a graph showing strain as a function of a range of tightness levels.
FIG. 6 depicts a graph showing inductance of a variable inductor circuit as a function of strain at a magneto-elastic component.

Referring to FIG. 5, a graph depicts strain 504 (e.g., at the magneto-elastic component 104) as a function 506 of a range of tightness levels 502 (e.g., of the fastener 102). It should be noted that the function 506 may be linear or non-linear. For ease of explanation, the function 506 is depicted linearly.

The range of tightness levels 502 may include a first sub-range 516 and a second sub-range 518. The first sub-range 516 may correspond to the fastener 102 being in a tightened state. The second sub-range 518 may correspond to the fastener 102 being in an untightened state. Tightness, in this context, generally refers to the amount of contact force resulting from the combination of deflection and surface friction between contact surfaces of the fastener (e.g., threads, a fastener head surface, and/or a fastener nut surface) and a structure. Tightness typically manifests itself in the form of torque applied to the fastener, and may be expressed with any suitable units. The range of tightness levels 502 will vary with the type of fastener and its particular application. The widths of the sub-ranges 516, 518 may also depend on a particular application of the systems 100, 200. For example, in some applications, there may be a gap between the first sub-range 516 and the second sub-range 518 as depicted in FIG. 5. The gap may imply levels of tightness that are neither considered tightened or untightened. For example, the gap may represent a range that is within a certain tolerance of a tightened or an untightened state without being "fully" tightened or "fully" loosened. In other words, a fastener that falls within the gap may not be fully tightened, but may not be loose enough for concern. In other applications, the fastener may not be fully loosened, but may not be tightened enough to merit signaling that it is tightened. In some applications, the sub-ranges 516, 518 may abut each other, such that if a fastener is not considered tightened, then it is untightened. This may be useful in applications where a reader is configured only to signal when a fastener is in one of the two states.

The first sub-range 516 may correspond to a first range of strain levels 526 and the second sub-range 518 may correspond to a second range of strain levels 528. A first tightness level 510 of the fastener 102 that falls within the first sub-range 516 results in a first strain level 520 applied to the magneto-elastic component 104 falling within the first range of strain levels 526. Likewise, a second tightness level 514 of the fastener 102 that falls within the second sub-range 518 results in a second strain level 524 applied to the magneto-elastic component 104 falling within the second range of strain levels 528. A changing of tightness 512 of the fastener 102 from the first tightness level 510 (e.g., a tightened state) to the second level of tightness (e.g., an untightened state) results in a change 522 of strain level 504 at the magneto-elastic component 104. This change 522 in strain level 504 ultimately results in a shift in the resonance response frequency of the RFID circuit 108 as described herein.

Referring to FIG. 6, a graph depicts inductance 604 of the variable inductor circuit 106 as a function 606 of strain 504 at the magneto-elastic component 104. It should be noted that the function 606 may be linear or non-linear. For ease of explanation, the function 606 is depicted as slightly curved, but may take any shape.

The first range of strain levels 526 described with respect to FIG. 5 corresponds to a first range of inductance 626 as shown in FIG. 6 and the second range of strain levels 528 corresponds to a second range of inductance 628. Because the inductance 604 correlates to the strain 504 and the strain 504, in turn, correlates to the range of tightness levels 502, the first range of inductance 626 corresponds to the fastener 102 being in a tightened state and the second range of inductance 628 corresponds to the fastener 102 being in an untightened state. As shown in FIG. 6, the first strain level 520 results in a first inductance level 620 and the second strain level 524 results in a second inductance level 624. The change 522 in strain level 504 results in a change 622 in inductance 604.

Figure 7:
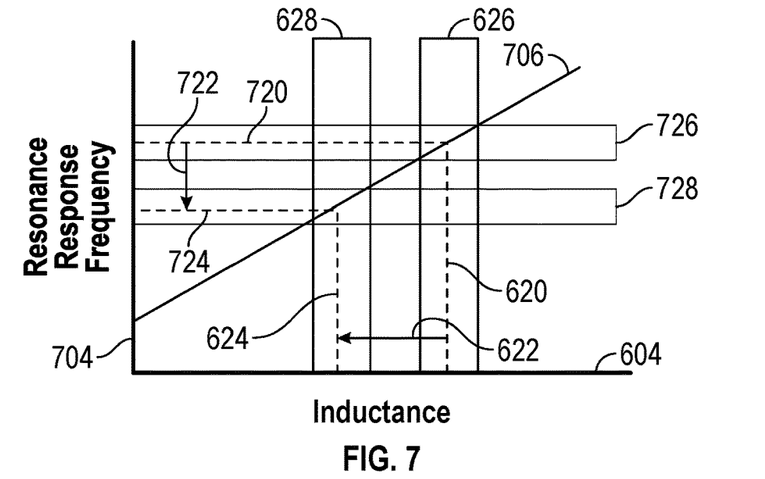
FIG. 7 depicts a graph showing resonance response frequencies of an RFID circuit as a function of the inductance at the variable inductor circuit.

Referring to FIG. 7, a graph depicts resonance response frequencies 704 of the RFID circuit 108 as a function 706 of the inductance 604 at the variable inductor circuit 106. It should be noted that the function 706 may be linear or non-linear. For ease of explanation, the function 706 is depicted as linear, but may take any shape.

The first range of inductance 626 described with respect to FIG. 6 corresponds to a first resonance response frequency band 726 as shown in FIG. 7 and the second range of inductance 628 corresponds to a second resonance response frequency band 728. Because the resonance response frequencies 704 correlate to the inductance 604 and the inductance 604, in turn, correlates to the strain 504, and the strain 504 correlates to the range of tightness levels 502, the first resonance response frequency band 726 corresponds to the fastener 102 being in a tightened state and the second resonance response frequency band 728 corresponds to the fastener 102 being in an untightened state. As shown in FIG. 7, the first inductance level 620 results in a first resonance response frequency 720 in the first resonance response frequency band 726 and the second inductance level 624 results in a second resonance response frequency 724 in the second resonance response frequency band 728. Thus, a change 522 in strain level 520 results in a change 622 in inductance 604, which may further result in a shift 722 in the resonance response frequency 720.

One of the resonance response frequency bands 726, 728 may correspond to a designated RFID band that may be used by the RFID reader 112. In cased where the first resonance response frequency band 726 corresponds to the designated RFID band, the RFID circuit 108 may activate and be detectible by the RFID reader 112 when the fastener 102 is in a tightened state. In cases where the second resonance response frequency band 728 corresponds to the designated RFID band, the RFID circuit 108 may activate and be detectible by the RFID reader 112 when the fastener 102 is in an untightened state. Thus, in some embodiments, the RFID reader 112 may be used to detect when the fastener 102 is tightened, while in other embodiments, the RFID reader 112 may be used to detect when the fastener 102 is in an untightened state.

Figure 8:
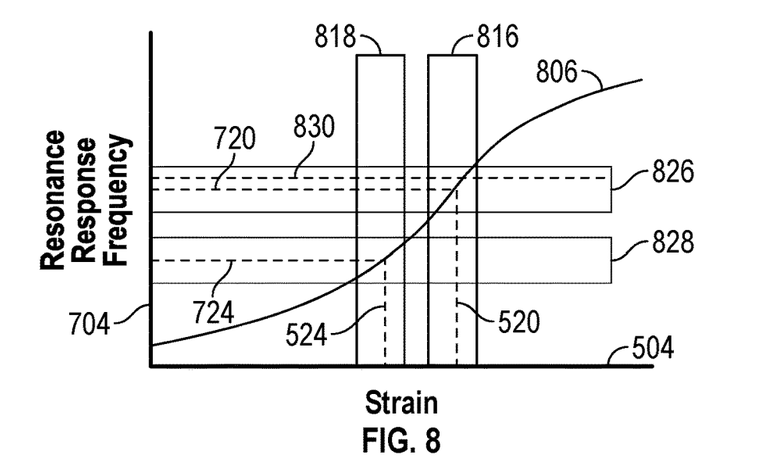
FIG. 8 depicts a graph showing resonance response frequencies of an RFID circuit as a function of strain applied to a magneto-elastic component.

Referring to FIGS. 8 and 9, the variable inductor circuit 106 may be tuned by adjusting, for example, a number of coils associated with the variable inductor circuit 106. By tuning the variable inductor circuit 106 to correspond to a function 806, as shown in FIG. 8, the RFID reader 112 may be configured to detect when the fastener 102 is in a tightened state. By tuning the variable inductor circuit 106 to correspond to a function 906, as shown in FIG. 9, the RFID reader 112 may be configured to detect when the fastener 102 is in an untightened state.

Referring to FIG. 8, a graph depicts resonance response frequencies 704 of the RFID circuit 108 as a function 806 of the strain 504 applied to the magneto-elastic component 104. It should be noted that the function 806 may be linear or non-linear. For ease of explanation, the function 806 is depicted as a curved function, but may take any shape.

In FIG. 8, the first strain level 520 (e.g., associated with the fastener 102 being in a tightened state) results in the first resonance response frequency 720. The first strain level 520 falls within a first range of strain levels 816 and the first resonance response frequency 720 falls within a first resonance response frequency band 826. A predetermined frequency 830 enables resonance of the RFID circuit 108 and activates the RFID circuit 108 when the RFID circuit 108 exhibits the first resonance response frequency 720. Thus, the predetermined frequency 830 enables resonance of the RFID circuit 108 and activates the RFID circuit 108 in response to the first range of strain levels 816 being applied to the magneto-elastic component 104. The first range of strain levels 816 may be associated with the fastener 102 being in a tightened stated.

The second strain level 524 (e.g., associated with the fastener 102 being in an untightened state) results in the second resonance response frequency 724. The second strain level 524 falls within a second range of strain levels 818 and the second resonance response frequency 724 falls within a second resonance response frequency band 828. The predetermined frequency 830 does not enable resonance and does not activate the RFID circuit when the RFID circuit 108 exhibits the second resonance response frequency 724. Thus, the predetermined frequency 830 does not enable resonance of the RFID circuit 108 and does not activate the RFID circuit 108 in response to the second range of strain levels 818 being applied to the magneto-elastic component 104. The second range of strain levels 818 may be associated with the fastener 102 being in an untightened state.

Referring to FIG. 9, a graph depicts resonance response frequencies 704 of the RFID circuit 108 as a function 906 of the strain 504 applied to the magneto-elastic component 104. It should be noted that the function 906 may be linear or non-linear. For ease of explanation, the function 906 is depicted as a curved function, but may take any shape.

In FIG. 9, the second strain level 524 (e.g., associated with the fastener 102 being in an untightened state) results in the first resonance response frequency 720. The second strain level 524 falls within a first range of strain levels 916 and the first resonance response frequency 720 falls within a first resonance response frequency band 926. The predetermined frequency 830 enables resonance of the RFID circuit 108 and activates the RFID circuit 108 when the RFID circuit 108 exhibits the first resonance response frequency 720. Thus, the predetermined frequency 830 enables resonance of the RFID circuit 108 and activates the RFID circuit 108 in response to the first range of strain levels 916 being applied to the magneto-elastic component 104. The first range of strain levels 916 is associated with the fastener 102 being in an untightened stated.

The first strain level 520 (e.g., associated with the fastener 102 being in a tightened state) results in a second resonance response frequency 924. The first strain level 520 falls within a second range of strain levels 918 and the second resonance response frequency 924 falls within a second resonance response frequency band 928. The predetermined frequency 830 does not enable resonance and does not activate the RFID circuit when the RFID circuit 108 exhibits the second resonance response frequency 924. Thus, the predetermined frequency 830 does not enable resonance of the RFID circuit 108 and does not activate the RFID circuit 108 in response to the second range of strain levels 918 being applied to the magneto-elastic component 104. The second range of strain levels 918 may be associated with the fastener 102 being in a tightened state.

Referring to FIG. 10, a graph depicts resonance response frequencies 704 of the RFID circuit 108 as a function 1006 of the strain 504 applied to the magneto-elastic component 104. It should be noted that the function 1006 may be linear or non-linear. For ease of explanation, the function 1006 is depicted as a curved function, but may take any shape.

The RFID reader 112 may be configured to transmit the excitation signal 114 over a range of frequencies 1026. The RFID reader 112 may then determine the resonance response frequency 720 of the RFID circuit 108 and map the resonance response frequency 720 to the first strain level 520 applied to the magneto-elastic component 104 within a range of strain levels 1016. This may enable the systems 100, 200 to be used to determine a level of strain associated with the fastener 102 instead of limiting readings to discrete states of tightness.

Referring to FIG. 11, a graph depicts strain 504 at both the magneto-elastic component 104 and at the magneto-elastic component 404 as a function 506 of a range of tightness levels 502 of the fastener 102.

As with FIG. 5, in FIG. 11 the range of tightness levels 502 may include a first sub-range 516 and a second sub-range 518. The first sub-range 516 may correspond to the fastener 102 being in a tightened state. The second sub-range 518 may correspond to the fastener 102 being in an untightened state. The first sub-range 516 corresponds to a first range of strain levels 526 and the second sub-range 518 corresponds to a second range of strain levels 528. When the fastener 102 is tight, a first tightness level 510 of the fastener 102 that falls within the first sub-range 516 results in a first strain level 520 applied to the magneto-elastic component 104 falling within the first range of strain levels 526. When the fastener 102 is loose, a second tightness level 1110 of the fastener 102 that falls within the second sub-range 518 results in a second strain level 1120 applied to the second magneto-elastic component 404 falling within the second range of strain levels 528.

As in FIG. 5, the widths of the sub-ranges 516, 518 may depend on a particular application of the systems 100-400. For example, in the case of the system 400, the gap between the first sub-range 516 and the second sub-range 518 may imply levels of tightness that are neither considered tightened or untightened. As described with reference to FIG. 5, the gap may represent a range that is within a certain tolerance of a tightened or an untightened state without being "fully" tightened or "fully" loosened. This may be useful in applications where a reader is configured to signal when a fastener is in a tightened state or a loosened state, but where the reader does not signal if the fastener is not in either of those states.

Referring to FIG. 12, a graph depicts inductance 604 of the variable inductor circuit 106 and the second variable inductor circuit 406 respectively as a function 606 of strain 504 at the magneto-elastic component 104 and as a function 1206 of strain 504 at the second magneto-elastic component 404. The difference between the function 606 and the function 1206 may be controlled through the dimensions of the magneto-elastic components 104, 404 and through the number of loops wrapped around the magneto-elastic components 104, 404 at the variable inductor circuits 106, 406.

The first range of strain levels 526 described with respect to FIG. 11 corresponds to a first range of inductance 626 as shown in FIG. 12 and the second range of strain levels 528 corresponds to a second range of inductance 628. Because the inductance 604 correlates to the strain 504 and the strain 504, in turn, correlates to the range of tightness levels 502, the first range of inductance 626 corresponds to the fastener 102 being in a tightened state and the second range of inductance 628 may correspond to the fastener 102 being in an untightened state. As shown in FIG. 12, the first strain level 520 at the magneto-elastic component 104 results in a first inductance level 620 at the variable inductor circuit 106 and the second strain level 1120 at the second magneto-elastic component 404 results in a second inductance level 1220 at the second variable inductor circuit 406. Because of the different configurations of the variable inductor circuits 106, 406 relative to each other, both the first inductance level 620 and the second inductance level 1220 falls within the first range of inductance 626.

Referring to FIG. 13, a graph depicts resonance response frequencies 704 of the RFID circuit 108 and the second RFID circuit 408 as a function 706 of the inductance 604 at the variable inductor circuit 106 and the second variable inductor circuit 406.

The first range of inductance 626 described with respect to FIG. 6 may correspond to a resonance response frequency band 726 as shown in FIG. 13. Because the resonance response frequencies 704 correlate to the inductance 604 and the inductance 604, in turn, correlates to the strain 504, and the strain 504 correlates to the range of tightness levels 502, the resonance response frequency band 726 corresponds to the fastener 102 being in a tightened state for the RFID circuit 108 and corresponds to the fastener 102 being in an untightened state for the second RFID circuit 408. Thus, when the fastener 102 is in a tightened state, the first inductance level 620 associated with the RFID circuit 108 results in a first resonance response frequency 720 that falls within the resonance response frequency band 726. When the fastener 102 is in an untightened state, the second inductance level 1220 associated with the second RFID circuit 408 results in a second resonance response frequency 1320 that falls within the resonance response frequency band 726.

Thus, referring again to FIG. 4, the RFID reader 112 operating within the resonance response frequency band 726 may receive the response signal 116 from the RFID circuit 108 when the fastener 102 is tightened and the second response signal 416 from the second RFID circuit 408 when the fastener 102 is untightened.

Figure 14:
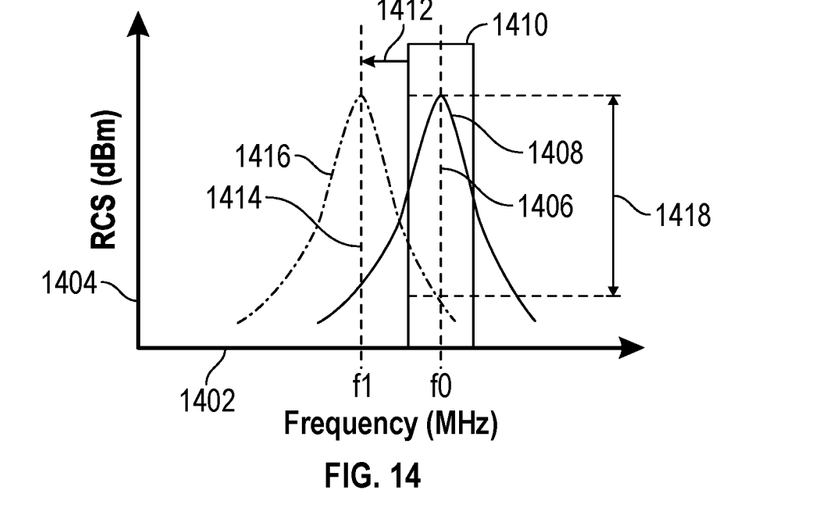
FIG. 14 depicts a graph showing a received signal level of an RFID circuit as a function of frequency.

Referring to FIG. 14, a graph depicts a received signal level 1404 of the RFID circuit 108 as a function of frequency 1402. FIG. 14 provides another visualization for the concepts described herein. While the fastener 102 is in a first state (e.g., either tightened or untightened), a resonance response frequency 1406 of the RFID circuit 108 falls within a designated RFID band 1410 (e.g., used by the RFID reader 112). A change in the tightness of the fastener 102 results in a shift 1412 of the resonance response frequency 1406 to a shifted resonance response frequency 1414 having a shifted curve 1416. Within the designated RFID band 1410, a difference 1418 between the signal level of the curve 1408 and the shifted curve 1416 results in the RFID reader 112 being unable to detect the RFID circuit 108.

Figure 15:
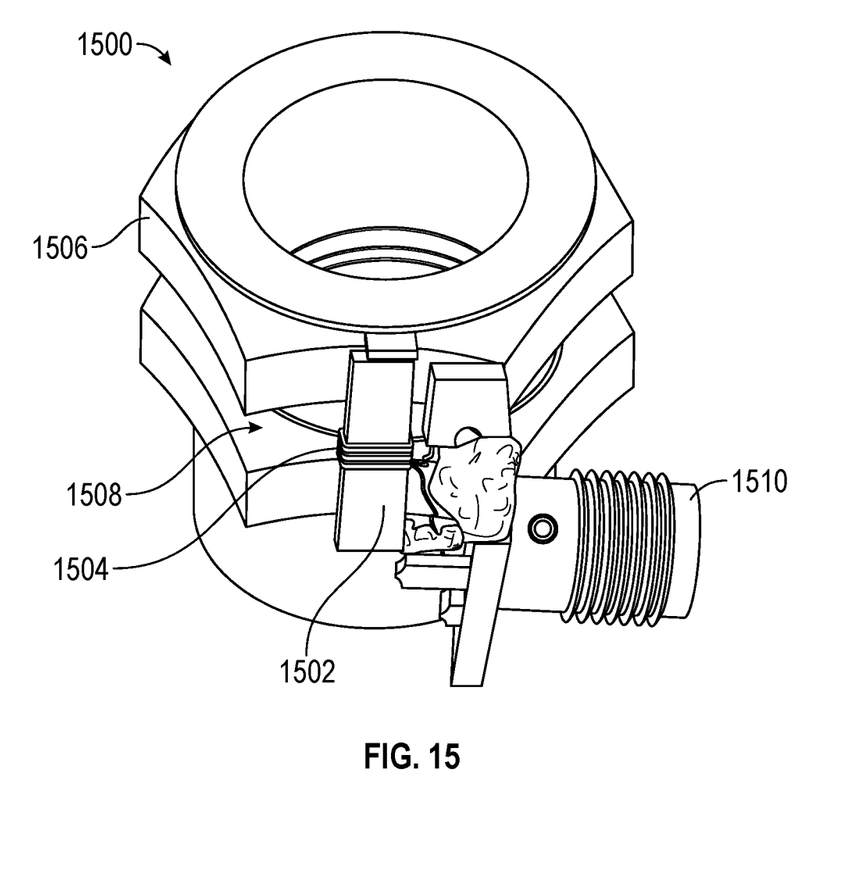
FIG. 15 depicts an embodiment of a smart fastener exhibiting variable inductance.

Referring to FIG. 15, an illustrative example of a smart fastener 1500 exhibiting variable inductance is depicted. Although other configurations are possible, the smart fastener 1500, which is shown in the form of an embodiment constructed in accordance with this disclosure, was fabricated by first cutting a magnetoelastic material (e.g., Galfenol-FeGa) into a strip 1502 having magnetoelastic domains positioned in parallel. A coil 1504 made of motor-winding wire was formed around the strip 1502 having several windings positioned around the center. The ends of the magnetoelastic strip 1502 were attached across a trench 1508 machined into a B-nut 1506 used as a pipe engagement fastener. The trench 1508 was fabricated in a way as to induce a strain across the width of the trench as the nut 1506 was fastened to a proper torque. A connector 1510 was attached to the coil 1504 to enable integration with an RFID system including an antenna (not shown). In practice, the RFID system will be directly integrated without the connector.

A network analyzer was used to measure the strain-induced magnetic permeability change of the described smart fastener 1500 and to measure the complex impedance of the smart fastener 1500. After fastening was simulated, the impedance changed by >15%, several times that of typical strain sensors currently used. Loosening the nut revealed the complex impedance came back to its starting value. Thus, the smart fastener 1500 may be reusable.

Figure 16:
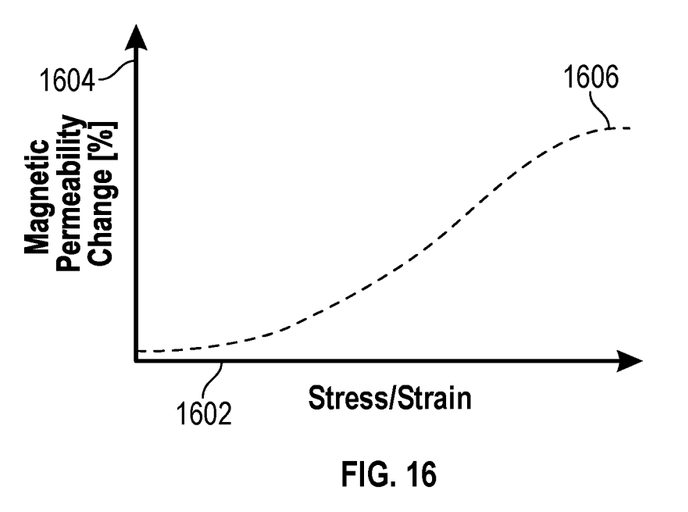
FIG. 16 depicts a graph showing an induced magnetic permeability change of a magneto-elastic component as a function of applied mechanical stress/strain of magnetoelastic materials.

Referring to FIG. 16, a graph depicts an induced magnetic permeability change 1604 of a magneto-elastic component as a function 1606 of applied mechanical stress/strain 1602 of the magnetoelastic materials. In the disclosed smart fastener application shown in FIG. 15, the applied stress/strain 1602 changes the magnetic relative permeability of ferromagnetic materials during the process of material deformation. The variation of materials' magnetization due to the applied mechanical loading changes the magnetostrictive strain until reaching its saturation value. Internally, ferromagnetic materials have a crystal structure that develops local magnetic domains, each of which is a region of uniform magnetic polarization. When a mechanical loading is applied, the boundaries between the domains shift and the domains rotate. Both of these effects may cause a change in the material's magnetization.

Figure 17:
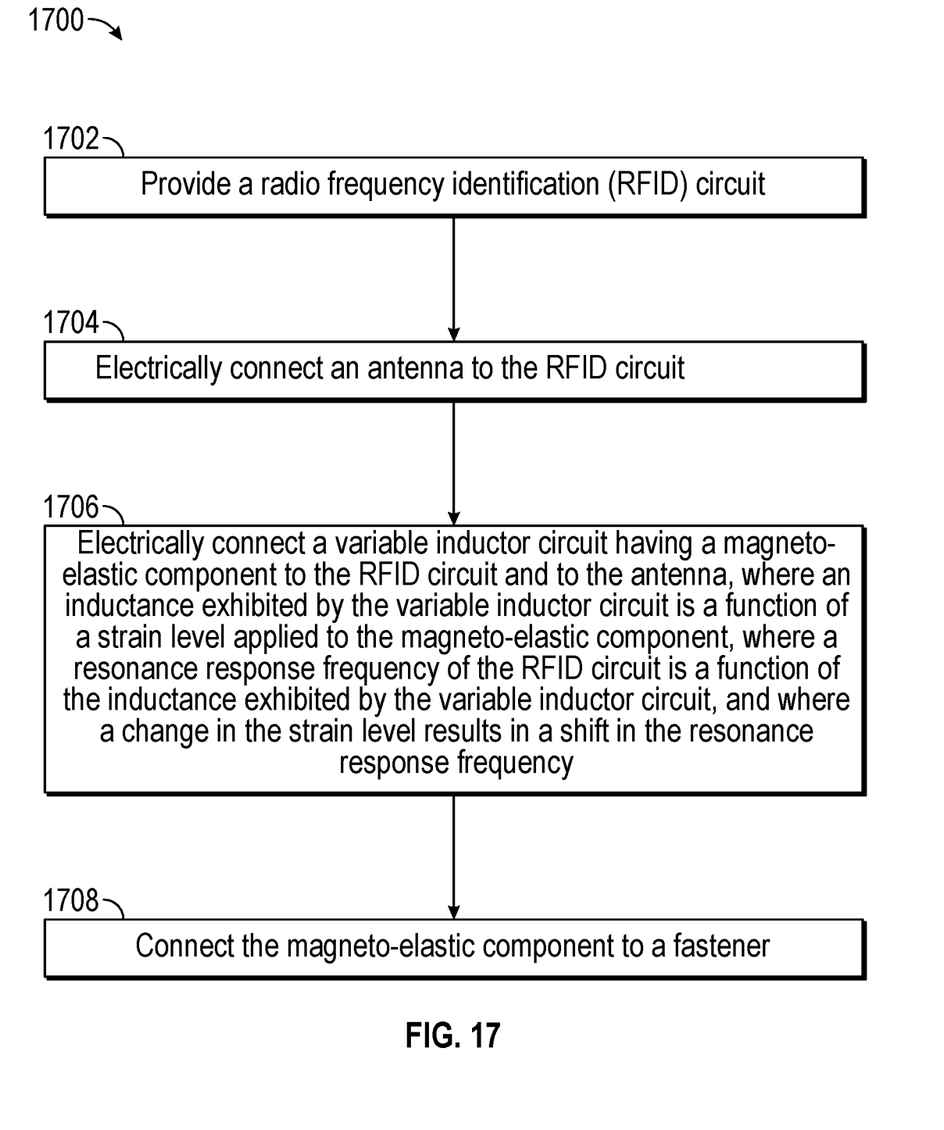
FIG. 17 is a flow chart of an embodiment of a method for RFID smart sensing.

Referring to FIG. 17, a method 1700 for RFID smart sensing is depicted. The method 1700 includes providing an RFID circuit, at 1702. For example, the RFID circuit 108 may be provided as part of the systems 100, 200, 300, 400.

The method 1700 further includes providing an antenna electrically connected to the RFID circuit, at 1704. For example, the antennas 110, 210, 310, 410 may be provided as part of the systems 100, 200.

The method 1700 also includes providing a variable inductor circuit having a magneto-elastic component, at 1706. For example, the variable inductor circuit 106 may be provided as part of the systems 100, 200 and may include the magneto-elastic component 104. Further, an inductance exhibited by the variable inductor circuit may be a function of a strain level applied to the magneto-elastic component, a resonance response frequency of the RFID circuit may be a function of the inductance exhibited by the variable inductor circuit, and a change in the strain level may result in a shift in the resonance response frequency.

The method 1700 includes connecting the magneto-elastic component to a fastener, at 1708. For example, the magneto-elastic component 104 may be attached to the fastener 102.

Although various embodiments have been shown and described, the present disclosure is not so limited and will be understood to include all such modifications and variations as would be apparent to one skilled in the art.

What is claimed is:

1. A system comprising:
   a fastener having a trench formed in a side of a head of the fastener;
   a magneto-elastic component spanning the trench and attached to the head of the fastener on both sides of the trench;
   a coil wrapped around the magneto-elastic component between both sides of the trench; and
   a radio frequency identification (RFID) circuit, wherein the coil is electrically connected to the RFID circuit resulting in a resonance response frequency that is a function of a strain level applied to the magneto-elastic component.

2. The system of claim 1, wherein a first range of strain levels applied to the magneto-elastic component results in a first range of resonance response frequencies and a second range of strain levels applied to the magneto-elastic component results in a second range of resonance response frequencies.

3. The system of claim 2, further comprising an RFID reader, wherein the first range of resonance response frequencies corresponds to a designated RFID band of the RFID reader.

4. The system of claim 3, wherein the RFID reader is configured to transmit an excitation signal at a predetermined frequency that enables activates the RFID circuit, and wherein the RFID circuit resonates in response to the predetermined frequency when the strain level applied to the magneto-elastic component is within the first range of strain levels, and wherein the RFID circuit does not resonate in response to the predetermined frequency when the strain level applied to the magneto-elastic component is within the second range of strain levels.

5. The system of claim 4, wherein the first range of strain levels is associated with the fastener being in a tight state and the second range of strain levels is associated with the fastener being in a loose state, or wherein the first range of strain levels is associated with the fastener being the loose state and the second range of strain levels is associated with the fastener being in the tight state.

6. The system of claim 3, wherein the RFID reader is configured to:
   transmit an excitation signal over a range of frequencies;
   determine the resonance response frequency of the RFID circuit: and
   map the resonance response frequency of the RFID circuit to the strain level applied to the magneto-elastic component.

7. The system of claim 3, further comprising:
   additional fasteners;
   additional magneto-electric components;
   additional RFID circuits and with additional variable inductor circuits; and
   additional coils wrapped around the additional magneto-elastic components, wherein the additional coils are electrically connected to the additional RFID circuits resulting in additional resonance response frequencies that are a function of additional strain levels applied to the additional magneto-elastic components, and wherein the designated band of the RFID reader corresponds to a loose state, thereby enabling the fastener to be located among the additional fastener while the fastener is in a loose state and the additional fasteners are in a tight state.

8. The system of claim 7, wherein the RFID circuit is configured to transmit an identifier that is usable to locate the fastener.

9. The system of claim 1, further comprising:
   a second magneto-elastic component attached to the head of the fastener;
   a second coil wrapped around the magneto-elastic component; and
   a second RFID circuit, wherein the second coil is electrically connected to the second RFID circuit resulting in a second resonance response frequency that is a function of a second strain level applied to the second magneto-elastic component.

10. The system of claim 9, wherein the resonance response frequency of the RFID circuit is within a designated RFID band of an RFID reader in response to the strain level applied to the magneto-elastic component corresponding to the fastener being in a tight state, and wherein the second resonance response frequency of the second RFID circuit is within the designated RFID band in response to the second strain level applied to the second magneto-elastic component corresponding to the fastener being in a loose state.

11. An apparatus comprising:
a radio frequency identification (RFID) circuit;
an antenna electrically connected to the RFID circuit; and
a variable inductor circuit electrically coupled to the RFID circuit and to the antenna, the variable inductor circuit comprising a magneto-elastic component coupled to both sides of a trench formed within a side of a head of a fastener, wherein an inductance exhibited by the variable inductor circuit is a function of a strain level applied to the magneto-elastic component across the trench, wherein a resonance response frequency of the RFID circuit is a function of the inductance exhibited by the variable inductor circuit, wherein a change in the strain level results in a shift in the resonance response frequency, and wherein a predetermined strain level range, associated with the fastener being in a tightened state, results in a predetermined resonance response frequency band.

12. The apparatus of claim 11, wherein the antenna is a dipole antenna, and wherein the predetermined resonance response frequency band is an ultra-high-frequency (UHF) band.

13. The apparatus of claim 11, wherein the antenna is a loop antenna, and wherein the predetermined resonance response frequency band is a high-frequency (HF) band or a low-frequency (LF) band.

14. The apparatus of claim 13, wherein the variable inductor circuit is incorporated into a loop of the loop antenna.

15. The apparatus of claim 11, wherein the variable inductor circuit includes an inductor coil surrounding the magneto-elastic component.

16. The apparatus of claim 11, wherein the magneto-elastic component includes a multiferroic material core.

17. A method comprising:
forming a trench in a side of a head of a fastener;
attaching a magneto-elastic component to both sides of the trench so that the magneto-elastic component spans the trench;
wrapping a coil around the magneto-elastic component so that the coil is positioned between both sides of the trench after the magneto-elastic component is attached to both sides of the trench; and
electrically connecting the coil to a radio frequency identification (RFID) circuit, resulting in a resonance response frequency that is a function of a strain level applied to the magneto-elastic component.

18. The method of claim 17, wherein the resonance response frequency of the RFID circuit is within a designated RFID band of an RFID reader in response to the strain level applied to the magneto-elastic component corresponding to the fastener being in a tight state.

19. The method of claim 17, wherein the resonance response frequency of the RFID circuit is within a designated RFID band of an RFID reader in response to the strain level applied to the magneto-elastic component corresponding to the fastener being in a loose state.

20. The method of claim 17, further comprising:
changing the strain level applied to the magneto-elastic component and thereby shifting the resonance response frequency of the RFID circuit.

* * * * *